United States Patent [19]

Schartinger

[11] Patent Number: 5,237,899
[45] Date of Patent: Aug. 24, 1993

[54] BLADE FOR CUTTING CYLINDRICAL STRUCTURES

[75] Inventor: Edward J. Schartinger, Peterborough, Canada

[73] Assignee: General Electric Canada Inc., Mississauga, Canada

[21] Appl. No.: 922,416

[22] Filed: Jul. 31, 1992

[30] Foreign Application Priority Data

Aug. 8, 1991 [CA] Canada .................. 2048780

[51] Int. Cl.⁵ .......................................... B23D 21/00
[52] U.S. Cl. .......................................... 83/454; 30/92; 30/357; 83/54; 83/636; 83/694
[58] Field of Search .................. 30/92, 92.5, 346, 353, 30/355, 357; 166/55; 83/54, 452, 697, 694, 375, 385, 454, 636; 72/324, 325, 326

[56] References Cited

U.S. PATENT DOCUMENTS

| | | | |
|---|---|---|---|
| 2,596,851 | 5/1952 | Hansen | 30/355 |
| 2,870,538 | 1/1959 | Townshend | 30/254 |
| 3,516,312 | 6/1970 | Nordberg et al. | 83/54 |
| 3,595,116 | 7/1971 | Gilbert | 83/54 |
| 3,924,502 | 12/1975 | Borzym | 83/54 |
| 4,347,724 | 9/1982 | Brown et al. | 83/694 |
| 4,412,380 | 11/1983 | Kish | 30/92 |
| 4,549,349 | 10/1985 | Harrison | 30/92 |
| 4,608,754 | 9/1986 | Kloster | 30/92 |
| 4,845,849 | 7/1989 | Aubriot | 30/92 |

FOREIGN PATENT DOCUMENTS

| | | | |
|---|---|---|---|
| 1287015 | 1/1962 | France | 30/92 |
| 0089423 | 7/1981 | Japan | 30/92 |
| 0185511 | 8/1988 | Japan | 30/92 |
| 0959935 | 9/1982 | U.S.S.R. | 30/92 |
| 1328088 | 8/1987 | U.S.S.R. | 30/92 |

*Primary Examiner*—Hien H. Phan
*Assistant Examiner*—Hwei-Siu Payer

[57] ABSTRACT

A blade for cutting cylindrical structures is disclosed. The working face of the blade is adapted for piercing and cutting. The blade of the invention works to cut cylindrical structures without substantially deforming the wall of the structure adjacent to the cut. The blade may be of use in a variety of devices for cutting cylindrical structures.

13 Claims, 7 Drawing Sheets

BLADE FOR CUTTING CYLINDRICAL STRUCTURES

FIELD OF THE INVENTION

This invention relates to a blade for cutting cylindrical structures In particular, it relates to a blade for cutting cylindrical structures without substantially deforming the structure adjacent to the cut.

BACKGROUND OF THE INVENTION

The shearing action of blade-type cutters often causes thin-walled cylindrical structures to be substantially deformed adjacent to the cut. In an attempt to prevent deformation of resilient structures and thereby gain an improved cut, blades with piercing points are used. Blades such as these are disclosed in U.S. Pat. No. 2,870,538 issued to Townshend on Jan. 27, 1959, U.S. Pat. No. 4,412,380 issued to Kish on Nov. 1, 1983 and U.S. Pat. No. 4,845,849 issued to Aubriot on Jul. 11, 1989. While the disclosed cutters provide an improved cut to resilient structures, these cutters still cause thin-walled, less resilient structures to be deformed.

Blade-type cutters with piercing points for use in cutting thin walled structures have been disclosed. U.S. Pat. No. 4,549,349 to Harrison issued Oct. 29, 1985 discloses a blade-type cutter having a piercing point. The cutting of thin-walled structures is enhanced by this blade however the final severed structure is partially flattened.

A blade is disclosed herein which cuts cylindrical structures without substantially deforming the wall curvature of the structure adjacent to the cut.

OBJECT OF THE INVENTION

An object of the present invention is to provide a blade for cutting cylindrical structures without substantially deforming the wall curvature of the structure adjacent the cut.

It is another object of the present invention to provide a device comprising two blades for cutting through a cylindrical structure without substantially deforming the wall curvature of the structure adjacent to the cut.

It is a further object of the present invention to provide a device comprising a blade and an anvil for cutting through a cylindrical structure without substantially deforming the wall curvature of the structure adjacent the cut.

SUMMARY OF THE INVENTION

According to the invention there is provided a blade for cutting a cylindrical structure. The blade has curved edge portions which have a predetermined curvature such that each curved edge portion cuts the structure at a predetermined critical angle so that the blade cuts the cylindrical structure without substantially deforming the structure adjacent to the cut.

According to a broad aspect of the invention there is provided a blade for cutting a cylindrical structure. The structure to be cut is selected to have a predetermined wall curvature about a central axis. The blade comprises a body having a working face including a projecting portion and curved edge portions. The projecting portion and the curved edge portions are adapted to pierce and cut the structure respectively. The working face is positioned to move along a plane orthogonal to the central axis of the structure. The projecting portion is aligned with the central axis of the structure and is adapted to pierce the structure. The curved edge portions extend from each side of the projecting portion and intersect at the projecting portion. The curved edge portions have a predetermined curvature such that each curved edge portion cuts the structure at a predetermined critical angle. The critical angle is defined as that angle found between the tangent to the wall of the structure and the tangent to the curved edge portion of the blade so that the curved edge portion cuts the structure without substantially deforming the wall curvature of the structure adjacent to the cut.

In accordance with another aspect of the invention there is provided a device for cutting through a cylindrical structure. The structure to be cut is selected to have a predetermined wall curvature about a central axis. The device comprises two blades. Each blade is as herein before described. The blades of the device are moveable toward one another between a first open position in which the structure may be positioned between the blades, and a second closed, final position in which the blades are positioned in close overlapping relation. The blades slidably move within their respective planes from the first to the second position to cut the structure. At the first open position the projecting points of the two blades are aligned to pierce the structure at diametrically opposed points. After the projecting portions pierce the diametrically opposed points the curved edge portions of each of the blades continue the cut around the structure towards one another until the structure is completely cut. At this point the second closed position of the blades is reached.

In accordance with a further aspect of the present invention there is provided a device for cutting through a cylindrical structure. The cylindrical structure is selected to have a predetermined wall curvature about a central axis. The device comprises a blade, as herein before described, and an anvil. The anvil comprises a structure having two parallel walls positioned in a plane orthogonal to the central axis of the structure. The parallel walls are held in position to allow the blade to move therebetween. One end of the anvil defines a structure holding portion. The structure holding portion is shaped to accommodate the wall curvature of the structure. The blade of the device is moveable toward the anvil between a first open position in which the structure is positioned in the holding portion of the anvil, and a second closed, final position in which the blade is positioned in close overlapping relation between the walls of the anvil. During the functioning of the device the blade slidably moves from the first position to the second position to cut the structure. At the first open position, the projecting portion of the blade is positioned to pierce the structure at a point directly opposite the structure holding portion of the anvil. After the projecting portion pierces the point on the structure the curved edge portions of the blade continue the cut around the structure. When the projecting portion of the blade reaches the wall of the structure positioned in contact with the anvil, the structure is pierced again by the projecting portion. The curved edge portions of the blade continue cutting through the structure until the structure is completely cut.

BRIEF DESCRIPTION OF DRAWINGS

For a better understanding of the nature and objects of the present invention reference may be had by way of example to the accompanying diagrammatic drawings in which.

DESCRIPTION OF THE PREFERRED EMBODIMENT

Figures 1, 1A:
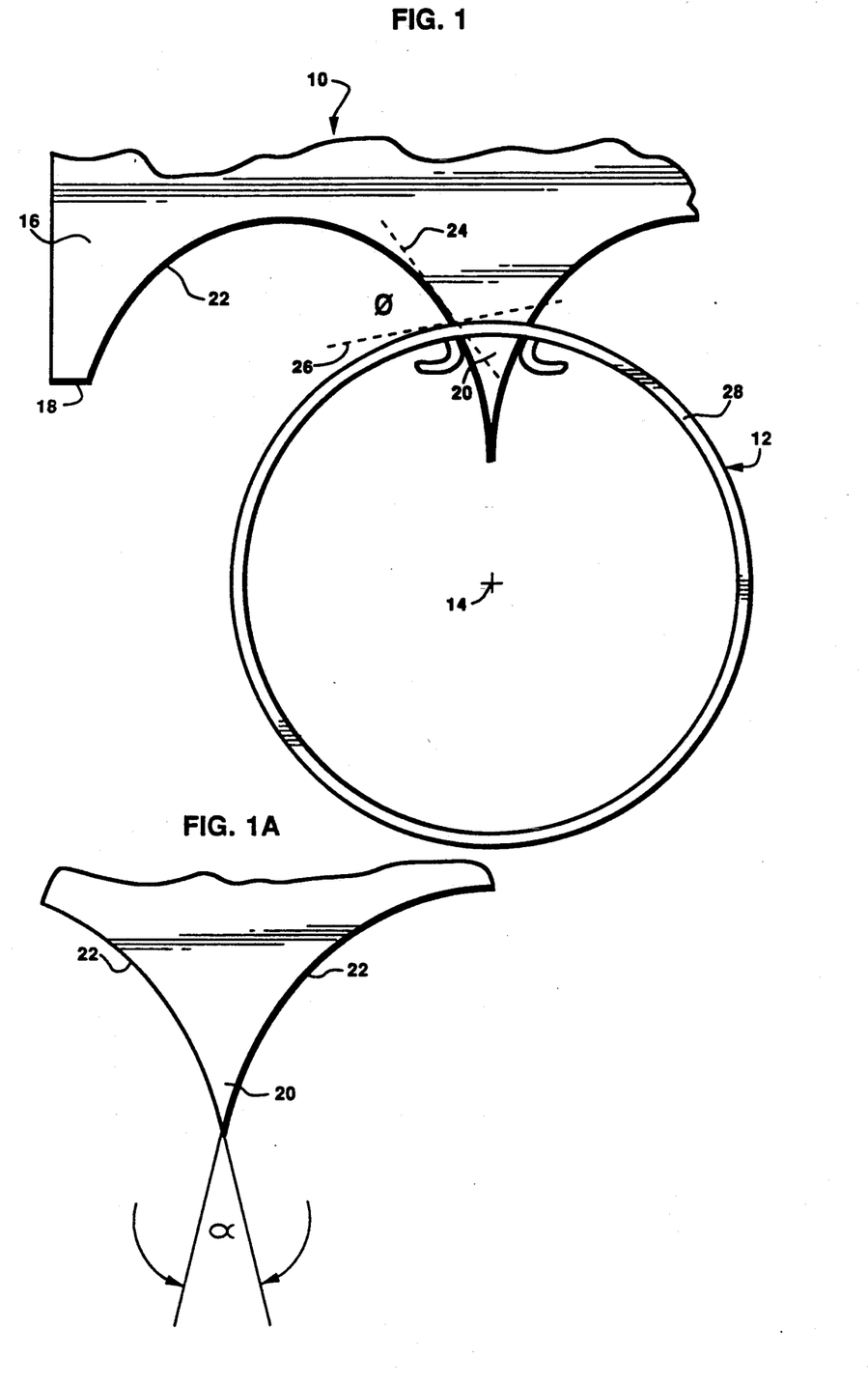
FIG. 1 is a view of the blade of the present invention cutting a cylindrical structure taken along the central axis of the structure.
FIG. 1a is an enlarged view of the projecting portion of the blade.
Figure 2:
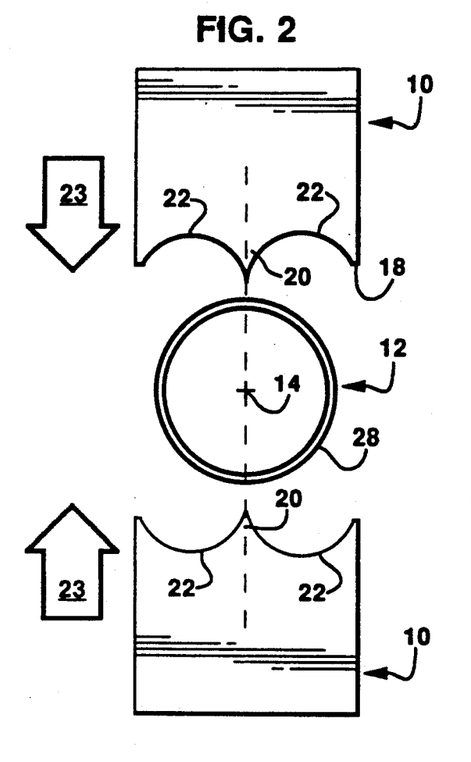
FIGS. 2, 3, 4 and 5 are plan views of a cutting sequence, two blades.
Figure 3:
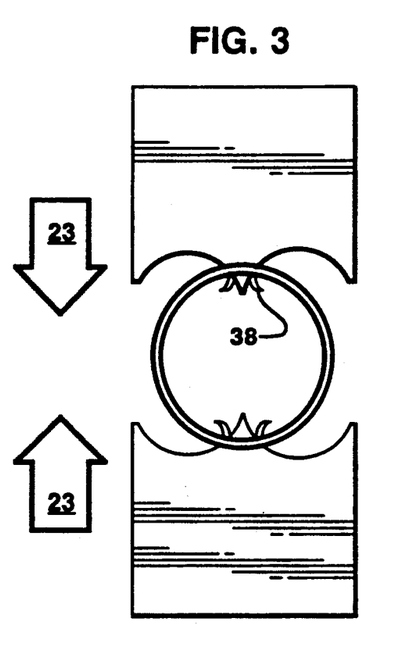
Figure 9:
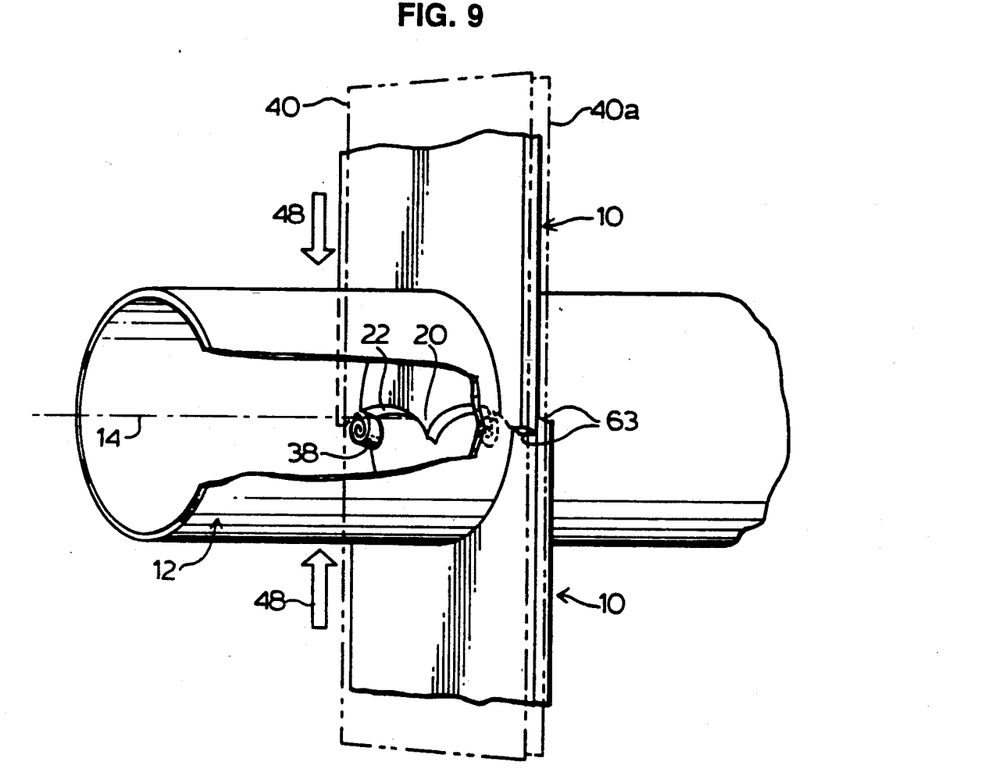
FIG. 9 is a partially cut away view of the cutting action of a two blade system.

Referring to FIG. 1 there is shown a blade 10 for cutting a cylindrical structure 12. The cylindrical structure 12 is selected to have a predetermined wall curvature 28 about a central axis 14 which is determined by the radius of the cylindrical structure from axis 14 to wall 28. The blade is of particular interest in cutting thin walled structures without substantial deformation adjacent to the cut. In particular cylindrical structures where the ratio of the diameter to the wall thickness lies in the range of 20:1 to 500:1. The blade 10 comprises a body 16 having a working face 18 which includes a projecting portion 20 and curved edge portions 22. The projecting portion 20 is adapted to make an initial pierce in the structure while the curved edge portions 22 continue the cutting process around the structure 12. The working face 18 is positioned to move along a plane 40 orthogonal to the central axis 14 of the structure 12 (as shown in FIG. 9). In FIG. 9, two opposing blades 10 are shown. It should be understood that each blade will move along a respective orthogonal plane 40, 40A such that the blades will overlap each other when the cut is completed.

The projecting portion 20 of the working face 18 is aligned with the central axis 14 of the structure 12 and is adapted to pierce the structure. As seen enlarged in FIG. 1a, the curved edge portions 22 extend from each side of the projecting portion 20. The angle $\alpha$ at the intersection of curved edge portions must be defined according to the structure to be cut as that angle at which projecting portion 20 is able to pierce the structure without causing substantial deformation of the wall 28 adjacent the pierce. The angle $\alpha$ may vary between 20° to 50°. Preferably for metal cylindrical structures the angle $\alpha$ is defined between 30° and 40°.

Referring again to FIG. 1, the blade has curved edge portions 22 which follow the outside contour of the cylindrical structure 12 while maintaining a critical cutting angle $\phi$. The curved edge portions 22 have a predetermined curvature such that each curved edge portion 22 cuts the structure 12 at a common predetermined critical angle $\phi$ defined between the tangent 26 to the wall curvature 28 of the structure 12 and the tangent 24 to the curved edge portion 22 of the blade 10. The critical angle $\phi$ is selected so that the curved edge portion 22 cuts the structure 12 without substantially deforming the wall curvature of the structure adjacent the cut. The curvature of the edge portions 22 may be selected to be semi-circular or semi-elliptical. For metal cylindrical structures the critical angle $\phi$ may vary between 10° to 30°.

Figure 4:
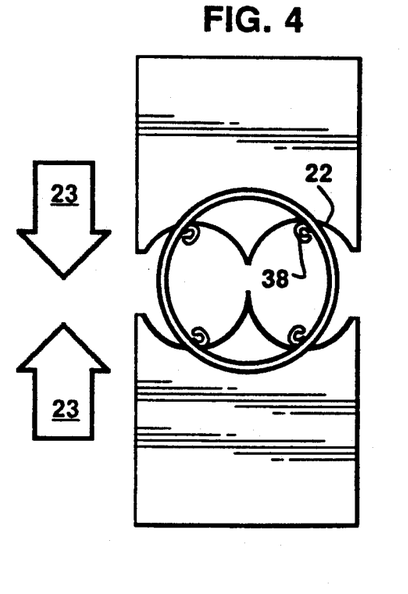
Figure 5:
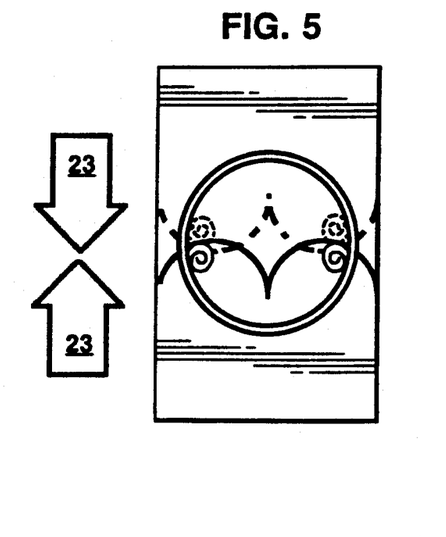
Figure 6:
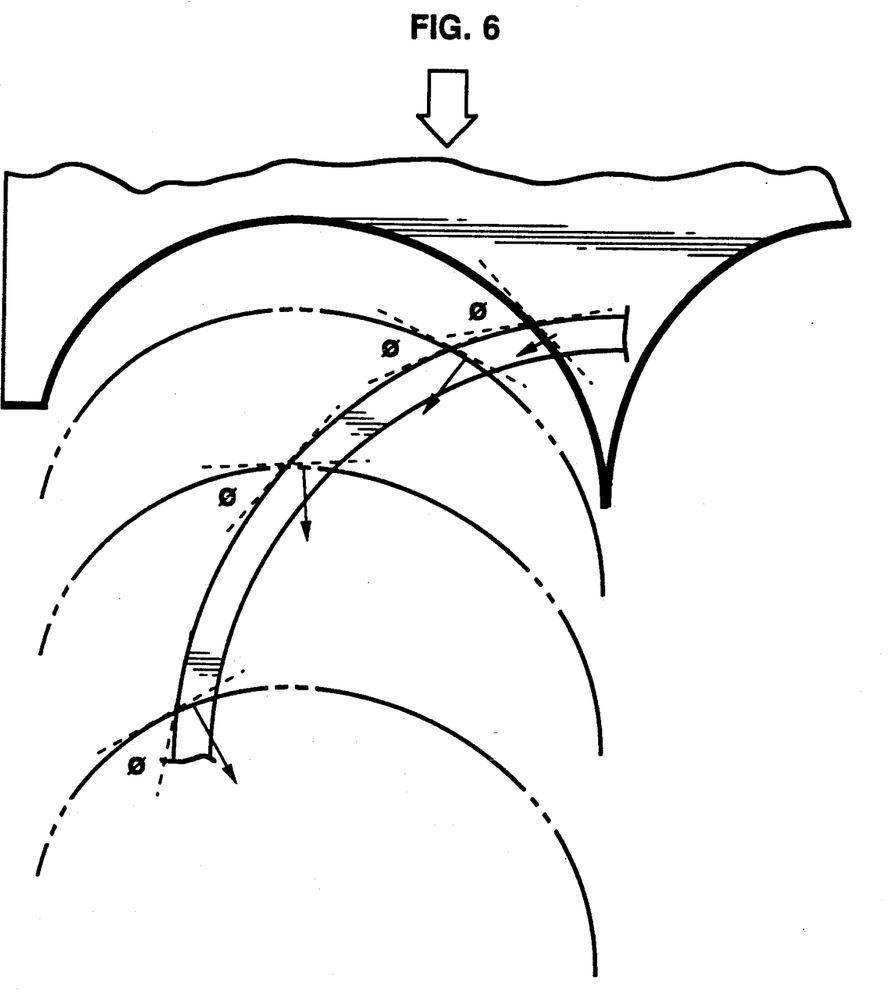
FIG. 6 is a view of the cutting action of the blade showing the critical angle $\phi$ taken along the central axis of the structure.

The sequence of FIGS. 2, 3, 4 and 5, show two opposing blades, as previously described, effecting the cut of a cylindrical structure. Looking to FIG. 2, in the cutting process the projecting portions 20 of the blades 10 are aligned with the central axis 14 of the cylindrical structure 12 and move in respective planes 40, 40A (as shown in FIG. 9) orthogonal to this axis towards the structure 12 as shown by the arrows 23. Moving to FIG. 3, when the blades 10 reach the structure 12 the projecting portions 20 of the blades pierce the wall 28 of the structure. As the blades continue to move and the projecting portions 20 advance through the wall 28 (as shown in FIGS. 4 and 5) the curved portions 22 begin to extend the pierce and continue the cut around the wall 28 of the structure. During the cut the critical angle $\phi$ is positively maintained between the tangent to the wall of the structure 26 and the tangent to the curved edge portion of the blade 24. This cutting angle $\phi$ allows the wall of the structure to be cut cleanly without substantial deformation of the wall curvature 28 of the structure 12 adjacent the cut.

Figure 7A:
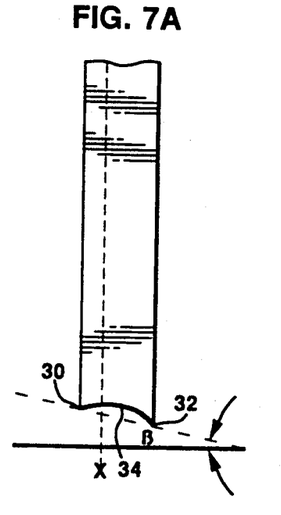
FIGS. 7a and 7b are sectional views of the bevelled face of the blade.
Figure 7B:
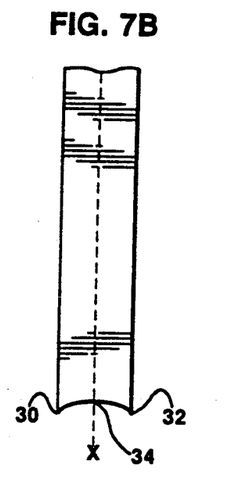

As shown in FIG. 7a and 7b the working face 18 of the blade can be modified to have a first cutting region 30 along an upper extremity thereof and a second cutting region 32 along a lower extremity thereof. This allows each of the curved edge portions 22 to cut at two points in close proximity so that a circumferential strip 38 (shown in FIGS. 4 and 9) is progressively sheared out of the wall 28 of the tube 12 without substantial deformation of the wall 28 adjacent the cut strips. The strip 38 which is being sheared will be rolled to the inside of the cylindrical structure because of the force of the curved edge portion on the strip (shown in FIGS. 4 and 9). Referring back to FIGS. 7a and 7b, the first and second cutting regions 30, 32 are made to have a bevelled face 34 therebetween. As shown particularly in FIG. 7b, the bevelled face 34 may have a center of curvature X at a central point between the first cutting region 30 and the second cutting region 32. Alternatively, as shown in FIG. 7a the bevelled face 34 may be worked so that the center of curvature X is slightly offset towards a selected one of the cutting regions 30,32 such that the selected cutting region is recessed from the other cutting region. In FIG. 7a, cutting region 30 has been selected to be recessed from cutting region 32 through working the bevelled face with an offset center of curvature towards cutting region 30. By varying the center of curvature, blades useful for different applications may be obtained. In some applications a blade may be required which has an angular cutting point therefore assisting in penetrating the wall of the cylindrical structure. Alternatively or in addition a blade may be required which will work on both the cutting of cylindrical structures and the shearing of other objects which are in close proximity to the cylindrical structure. In these applications a blade which has a bevelled face with the center of curvature offset to one side forming a blade with one recessed cutting region can be employed. The preferred embodiment of this type of blade is shown in FIG. 7a where the working face of the blade has been worked to have an angle β of between 5°-10°. Other applications may require a blade which has a bevelled face with a center of curvature at a central point between the two cutting regions.

Figure 8:
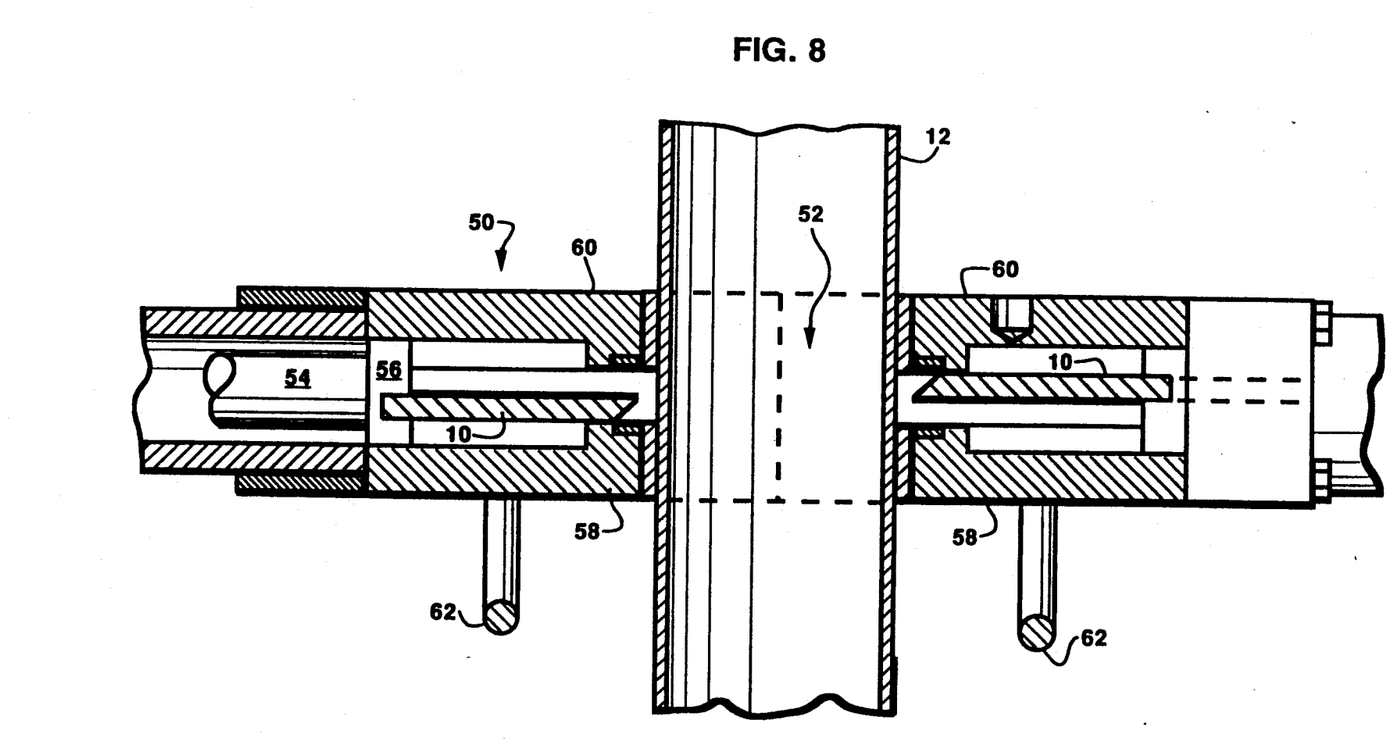
FIG. 8 is a side view of a preferred embodiment comprising two blades.

The blade of the present invention may be of use in a variety of devices for cutting cylindrical structures. One such device is shown in FIG. 8. Shown is a device for cutting a cylindrical structure 12 which has been selected to have a predetermined wall curvature about a central axis. The device 50 comprises two blades of the present invention 10 with a cutting action as described herein. The blades 10 are moveable to one another between a first open position (shown) and a second closed, final position as shown in FIG. 5. At the first open position the structure to be cut is positioned between the blades 10. The device may include a structure positioning apparatus 52 to hold the structure in proper position relative to the device during the cutting process. At the second closed position the blades will be positioned in close overlapping relation as shown in FIG. 5.

As shown in FIG. 9, the blades 10 are held in the device so that during the cutting process they slidably move over one another in the direction shown by arrow 48. After the projecting portions 20 pierce diametrically opposite points in the wall of the structure 12, the curved edge portions 22 continue the cut around the structure. The blades 10 will continue to move in opposing directions over one another until the structure 12 is completely cut. The cutting action of the blades 10 of the device 50 (shown in FIG. 8) can be seen clearly in FIG. 9. Two circumferential strips 38 form within the structure 12 while the blades 10 move one over the other. The structure will be completely severed when the cuts formed by the curved edge portions meet. The bevelling 63 of the blades 10 as shown forces the blades to remain in close contact with each other during the cutting process.

The preferred embodiment of the device of FIG. 8 may include an hydraulic means 54 for moving the blades. This would act directly on the end plate blade support 56. The blades in the open position, as shown, are guarded by the top body 58 and bottom body 60. The device 50 can be easily manipulated by two people using the handles 62.

Figure 10:
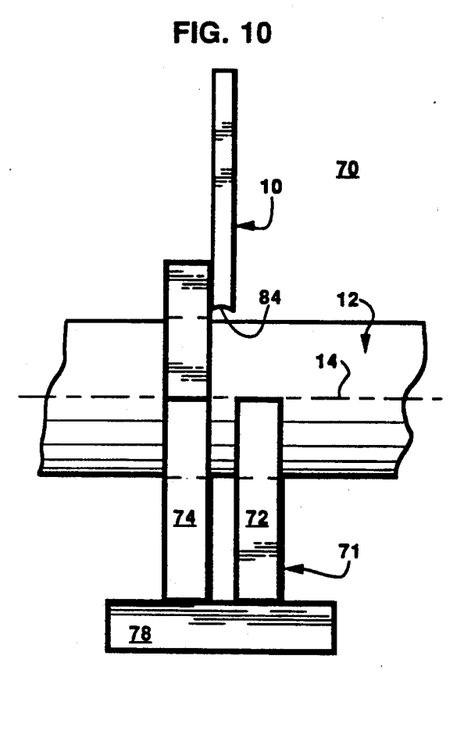
FIG. 10 is a side view of a preferred embodiment comprising a blade and an anvil.
Figure 11:
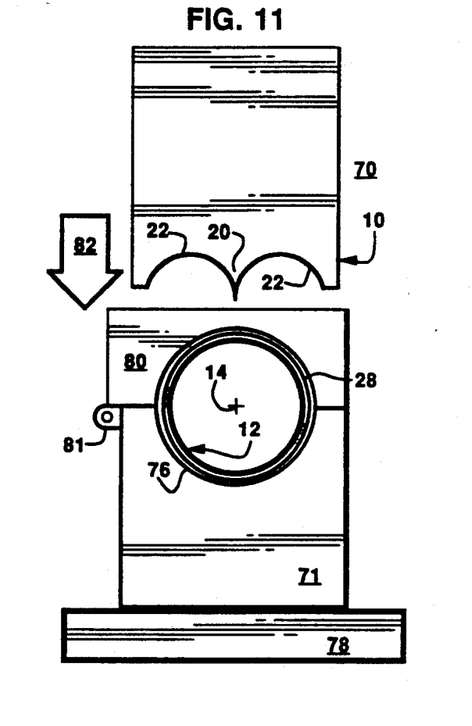
FIG. 11 is a plan view of the first open position of the device shown in FIG. 10.

An alternate device 70 shown in FIG. 10 comprises a blade of the present invention 10 and an anvil 71. The anvil 71 is intended to secure a cylindrical structure which is to be cut by the action of the blade 10. The anvil 71 comprises two parallel walls 72, 74 positioned in a plane orthogonal to the central axis 14 of the structure and aligned so that the plane of the blade passes between the walls 72, 74. The walls 72, 74 of the anvil 71 are spaced apart at a distance to allow the blade 10 to move between the walls while being in close contact with each of the walls 72, 74. The walls 72, 74 are held in position so that they are stationary in relation to each other. This may be accomplished by putting an end supporting wall 78 between the two parallel walls 72, 74. FIG. 11 shows the structure holding portion 76 of the anvil. The structure holding portion 76 is defined on each wall 72,74 in an identical manner. This portion 76 of the anvil is shaped to accommodate the wall curvature 28 of the structure 12 to be cut. The structure 12 is held in this portion 76 and is thereby prevented from rolling or shifting. Additionally, a further structure securing apparatus 80 may be attached by way of a hinge 81 to one or both walls 72, 74 of the anvil 71. The apparatus 80 is made to accommodate the wall curvature of the structure 28 when it is positioned over the structure 12 to be cut. The securing apparatus 80 completely prevents the structure 12 from moving or shifting during the cutting process.

Figure 12:
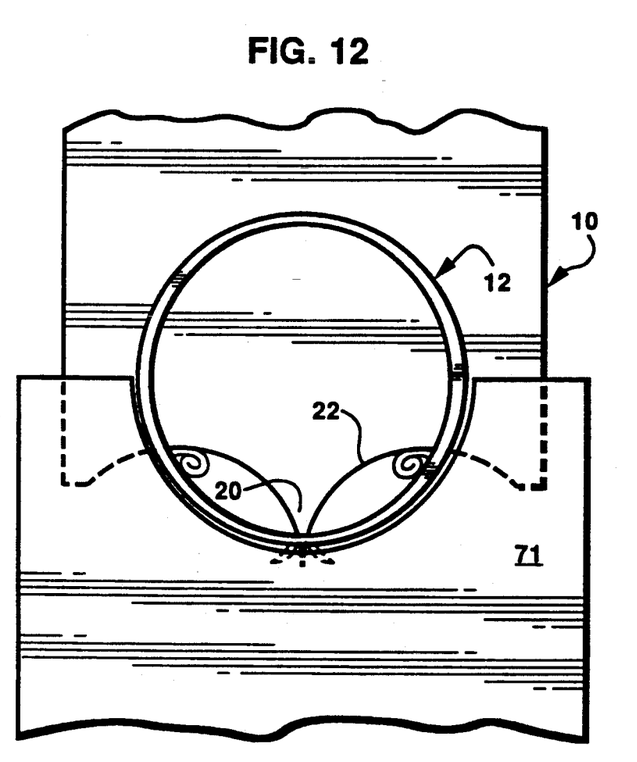
FIG. 12 is a view which follows FIG. 11 in the cutting sequence.
Figure 13:
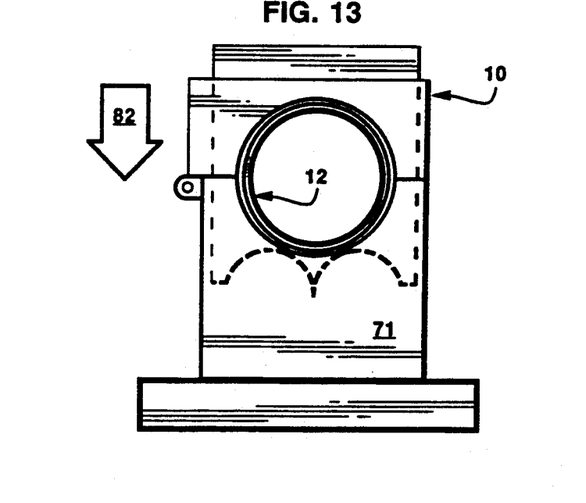
FIG. 13 is a view of the final closed position relating to FIG. 11.

The blade 10 of the device 70 is moveable toward the anvil 71 between a first open position in which the structure 12 maybe positioned in the holding portion 76 of the anvil 71 (shown in FIG. 11), and a second closed final position in which the blade 10 is positioned in close overlapping relation between the walls 72, 74 of the anvil 71 (shown in FIG. 13). During the functioning of the device 70, the blade 10 moves from the first position to the second position to cut the structure 12. As shown in FIG. 11, at the first open position the projecting portion 20 of the blade 10 is positioned to pierce the structure at a point directly opposite the structure holding portion 76 of the anvil 71. The blade 10 will move in the direction shown by the arrow 82 to pierce and cut the structure 12. After the projecting portion 20 makes an initial pierce the curved edge portions 22 of the blade 10 continue the cut around the structure. When the projecting portion 20 reaches the wall of the structure resting in the structure holding portion 76 of the anvil 71 the structure is pierced again by the projecting portion 20. At this point, the curved portions 22 directly adjacent the projecting portion will begin to cut the structure again as shown in FIG. 12. The structure will be completely severed when the cuts meet and the second closed final position of the blade is reached, as shown in FIG. 13. The bevel 84 shown allows the blade to cut circumferential strips from the structure during the cutting process which will remain in the plane of the blade and not hinder the movement of the blade between the walls of the anvil.

The devices 50 and 70 which incorporate the blade of the present invention have application in the nuclear industry for severing tubes located in the liquid zone control unit (LZCU) of a nuclear reactor. The LZCU is an assembly of small tubes which are contained inside a outer tube. To accommodate removal and shielded disposal of these tubes the outer and inner tubes must be severed without substantially deforming the outer tube. The blade of the present invention is employed to pierce and progressively cut the outer tube without substantial deformation of that tube adjacent the cut, while the inner tubes are crushed together and sheared. The severed tubes can then be removed and disposed of in shielded flasks.

What I claim as new and desire to secure by Letters Patent of the United States of America is:

1. A blade for cutting a cylindrical structure having a predetermined outer wall curvature about a central axis thereof, the blade comprising:

a body having a working face including a projecting portion adapted to pierce said structure and curved edge portions adapted to cut said structure, the working face being positioned to move along a plane orthogonal to the central axis of the structure, the projecting portion being aligned with the central axis of the structure and adapted to pierce said structure at the outer wall curvature of the structure without substantially deforming the wall curvature adjacent the pierce, and the curved edge portions extending from each side of the projecting portion and intersecting at the projecting portion, the curved edge portions having predetermined continuous curvature such that each curved edge portion cuts the structure at a predetermined critical angle defined between the tangent to the wall of the structure and the tangent to the curved edge portion of the blade so that the curved edge portion cuts the structure without substantially deforming the wall curvature of said structure adjacent the cut and wherein each curved edge portion has a cross section having a thickness, and a curvilinear bevelled face extends along the thickness wherein the bevelled face forms a first cutting region along an upper extremity thereof and a second cutting region along a lower extremity thereof so that the wall of the structure is progressively cut at two lines in close proximity by each curved portion.

2. The blade for cutting a cylindrical structure as in claim 1 wherein the curved edge portion extending from each side of the projecting portion has a predetermined substantially semi-circular curvature.

3. The blade for cutting a cylindrical structure as in claim 2 such that the predetermined critical angle defined between the tangent to the wall of the structure and the tangent to the curved edge portion of the blade may vary between about 10° to 30°.

4. The blade for cutting a cylindrical structure as in claim 1 wherein the curved edge portion extending from each side of the projecting portion has a predetermined substantially semi-elliptical curvature.

5. The blade for cutting a cylindrical structure as in claim 4 such that the predetermined critical angle defined between the tangent to the wall of the structure and the tangent to the curved edge portion of the blade may vary between about 10° to 30°.

6. The blade for cutting a cylindrical structure as in claim 1 wherein the curved edge portions are interested at the projecting portion at an angle of 20° to 50°.

7. The blade for cutting a cylindrical structure as in claim 6 wherein the curved edge portions are intersected at the projecting portion at an angle of 30° to 40°.

8. The blade for cutting a cylindrical structure as in claim 1 wherein the bevelled face has a center of curvature at a central point between the first cutting region and the second cutting region.

9. The blade for cutting a cylindrical structure as in claim 1 wherein the bevelled face has a center of curvature at a point offset towards a selected one of the cutting regions such that the selected cutting region is recessed from the other cutting region.

10. A device for cutting through a cylindrical structure having a predetermined wall curvature about a central axis thereof, the device comprising:
two blades, each blade comprising;
a body having a working face including a projecting portion and curved edge portions adapted to pierce and cut said structure, the working face being positioned to move along a plane orthogonal to the central axis of the structure,
the projecting portion being aligned with the central axis of the structure and adapted to pierce said structure, and
the curved edge portions extending from each side of the projecting portion and intersecting at the projecting portion, and the curved edge portions having predetermined curvature such that each curved edge portion cuts the structure at a predetermined critical angle defined between the tangent to the wall of the structure and the tangent to the curved edge portion of the blade so that the curved edge portion cuts the structure without substantially deforming the wall curvature of said structure adjacent the cut and wherein each curved edge portion has a cross section having a thickness, and a curvilinear bevelled face extends along the thickness wherein the bevelled face forms a first cutting region along an upper extremity thereof and a second cutting region along a lower extremity and the bevelled face having a center of curvature offset to a selected one of the cutting regions such that the selected cutting region is recessed in relation to the other cutting region, and
wherein the blades are positioned so that the cutting regions of each of the blades which are not recessed will be in contact with each other during the cutting process,
wherein the blades are moveable towards one another between a first open position in which the structure may be positioned between the blades so that the projecting portions of the blades are aligned to pierce the structure at diametrically opposed points, and a second closed final position in which the blades are positioned in close overlapping relation, the blades slidably moving in their respective planes from the first to the second position to pierce and continue the cut around the structure.

11. The device as in claim 10 further comprising a structure positioning apparatus attached to the device to hold the cylindrical structure in position relative to the device during the cut.

12. A device for cutting through a cylindrical structure having a predetermined outer wall curvature about a central axis thereof, the device comprising:
a blade, the blade comprising;
a body having a working face including a projecting portion adapted to pierce said structure and curved edge portions adapted to cut said structure, the working face being positioned to move along a plane orthogonal to the central axis of the structure,
the projecting portion being aligned with the central axis of the structure and adapted to pierce said structure at the outer wall curvature of the structure without substantially deforming the wall curvature of said structure adjacent the pierce, and
the curved edge portions extending from each side of the projecting portion and intersecting at the projecting portion, and the curved edge portions having predetermined continuous curvature such that each curved edge portion cuts the structure at a predetermined critical angle defined between the tangent to the wall of the structure and the tangent to the curved edge portion of the blade so that the curved edge portion cuts the structure without substantially deforming the wall curvature of said structure adjacent the cut, and wherein each curved edge portion has a cross section having a thickness, and a curvilinear bevelled face extends along the thickness wherein the bevelled face forms a first cutting region along an upper extremity thereof and a second cutting region along a lower extremity thereof and the bevelled face having a center of curvature at a central point between the first cutting region and the second cutting region, and an anvil, the anvil comprising, two parallel walls positioned in a plane orthogonal to the central axis of the structure and held in position to allow the blades to move therebetween, and an end of the anvil defining a structure holding portion, the structure holding portion shaped to accommodate the wall curvature of the structure, wherein the blade is moveable towards the anvil between a first open position in which the structure is positioned in the holding portion of the anvil so that the projecting portion of the blade is positioned to pierce the structure at point directly opposite the structure holding portion of the anvil, and a second closed final position in which the blade is positioned in a close overlapping relation between the walls of the anvil, the blade slidably moving from the first position to the second position to pierce the wall of the structure at two diametrically opposed points and cut through the structure.

13. The device as in claim 2 further comprises a structure securing apparatus having an arm hingeably attached to the anvil disposed to extend over the cylindrical structure and secure the structure in the structure holding portion of the anvil during the cut.

* * * * *